United States Patent [19]

Segrest et al.

[11] 3,991,475
[45] Nov. 16, 1976

[54] DEPTH SELECTING SPOOL DEVICE

[75] Inventors: Steven F. Segrest; James E. Preston, both of Panama City, Fla.

[73] Assignee: The United States of America as represented by the Secretary of the Navy, Washington, D.C.

[22] Filed: Dec. 5, 1975

[21] Appl. No.: 637,995

[52] U.S. Cl. ............................ 33/126.5; 254/186 R; 340/2; 9/8 R
[51] Int. Cl.² ........................................... G01B 3/00
[58] Field of Search ............ 33/126.5; 9/8 R; 340/2, 340/8 R; 242/84.1 L, 85.1; 254/186

[56] References Cited
UNITED STATES PATENTS

| | | |
|---|---|---|
| 3,093,808 | 6/1963 | Tatnall et al. .................... 9/8 R X |
| 3,262,090 | 7/1966 | Farmer ................................ 9/8 R X |
| 3,921,120 | 11/1975 | Widenhofer ...................... 9/8 R X |

Primary Examiner—Charles E. Phillips
Attorney, Agent, or Firm—Richard S. Sciascia; Don D. Doty; Harvey A. David

[57] ABSTRACT

A spool wherein line pay out is limited to a selected length by a pin that is retractable from one or more loops previously formed in the line and extending through a spool flange opening. A detented thumb wheel is eccentrically connected to the pin for retraction thereof.

7 Claims, 5 Drawing Figures

DEPTH SELECTING SPOOL DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to line spools or reels, and more particularly a spool or reel device that will permit a selectable, predetermined length of line to be payed out, for example between a float and a suspended, underwater payload.

Various devices have been proposed for suspending or tethering a payload of scientific or military equipment at a predetermined water depth. These have included hydrostatic pressure sensing devices that snub a line when a programmed depth is reached, and rotation counting devices that, in effect, measure the amount of line spooled out and actuate a snubber when the predetermined amount of line has been payed out.

The foregoing devices are unduly complex, expensive, and subject to malfunction in the harsh enviroment afforded in sea-water use. Accordingly, there exists a need for an inexpensive, reliable, and readily programmed line paying device for the above mentioned purposes.

SUMMARY OF THE INVENTION

The present invention aims to overcome most or all of the disadvantages of the prior art through the provision of a novel line spool device incorporating a reciprocable pin that is retractable from one or more stop elements, such as knotted loops at one or more locations along the line, by selector means which, in the preferred embodiment, comprises a rotatable dial or thumb-wheel that is calibrated with depth selecting indicia.

With the foregoing in mind, it is a principal object of the invention to provide an improved line paying spool device having a line length selecting feature.

Another object is to provide a reliable, inexpensive, light weight, and compact device for paying out a predetermined length of line between an underwater payload and a float or anchor so that the payload operating depth can be accurately and quickly selected just prior to deployment, for example by air drop.

As another object the invention aims to provide, in an air droppable instrumentation package including a drogue, a float, and and underwater payload, a spool device having a selectively adjustable line arresting means comprising a guide block having a bore in which a pin or rod is reciprocable and having a plurality of grooves or recesses intersecting the bore so that loops, spaced along the line wound on the spool, are each releasably retained in one of the grooves by the rod, and means for withdrawing the rod from one or more of the loops to select a line length that will pay out between the float and the payload.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1A:
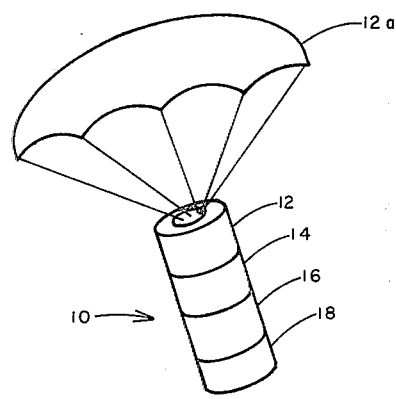
FIGS. 1a, 1b, and 1c are sequential elevational views of an air droppable instrumentation package including a spool device embodying the invention and shown in succeeding stages of deployment.
Figure 1B:
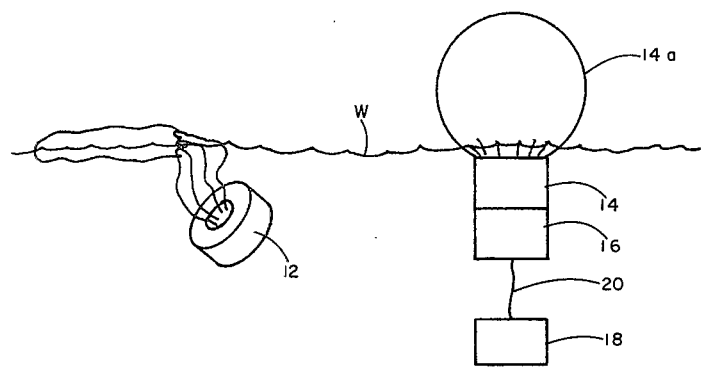
Figure 1C:
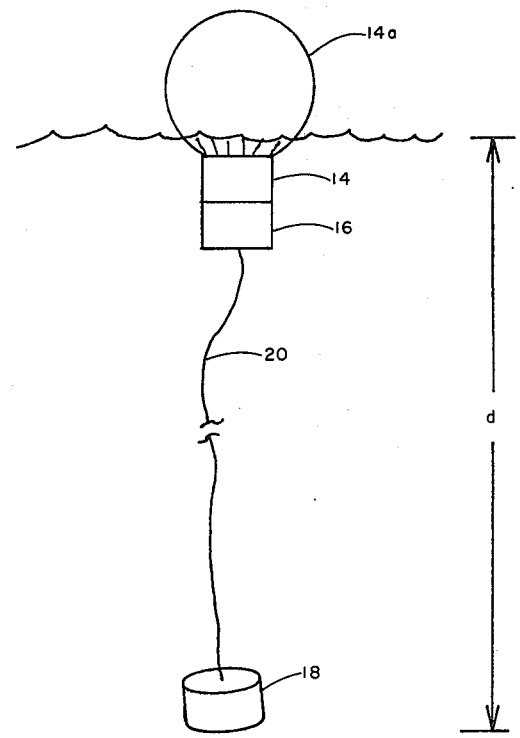

Referring to FIGS. 1a–1c, there is illustrated a system utilizing the invention. A package 10, dropped from an aircraft, for example, comprises a drogue or parachute section 12, a float section 14, a spool section 16, and a payload section 18. The parachute section 12 deploys a chute 12a to slow the descent of the package 10 to a rate that will prevent injury to the payload section 18 on impact with water W. Upon immersion in the water W, a water activated battery fires a squib means in a well known manner to separate the parachute section 12 from the rest of the package 10, to deploy an inflated float 14a from the float section 14, and to release the payload section 18 from the spool section 16. The state of operation a few seconds after immersion is illustrated in FIG. 2b.

Spool section 16, which will later be described in more detail with reference to FIGS. 2 and 3, pays out a predetermined length of line 20, which length is selectable according to this invention from a plurality of available lengths by means which will become apparent as this description proceeds. When the selected length of line 20 has payed out, fall of the payload section 18 will be arrested and maintained at a predetermined depth $d$ as illustrated in FIG. 1c.

Figure 2:
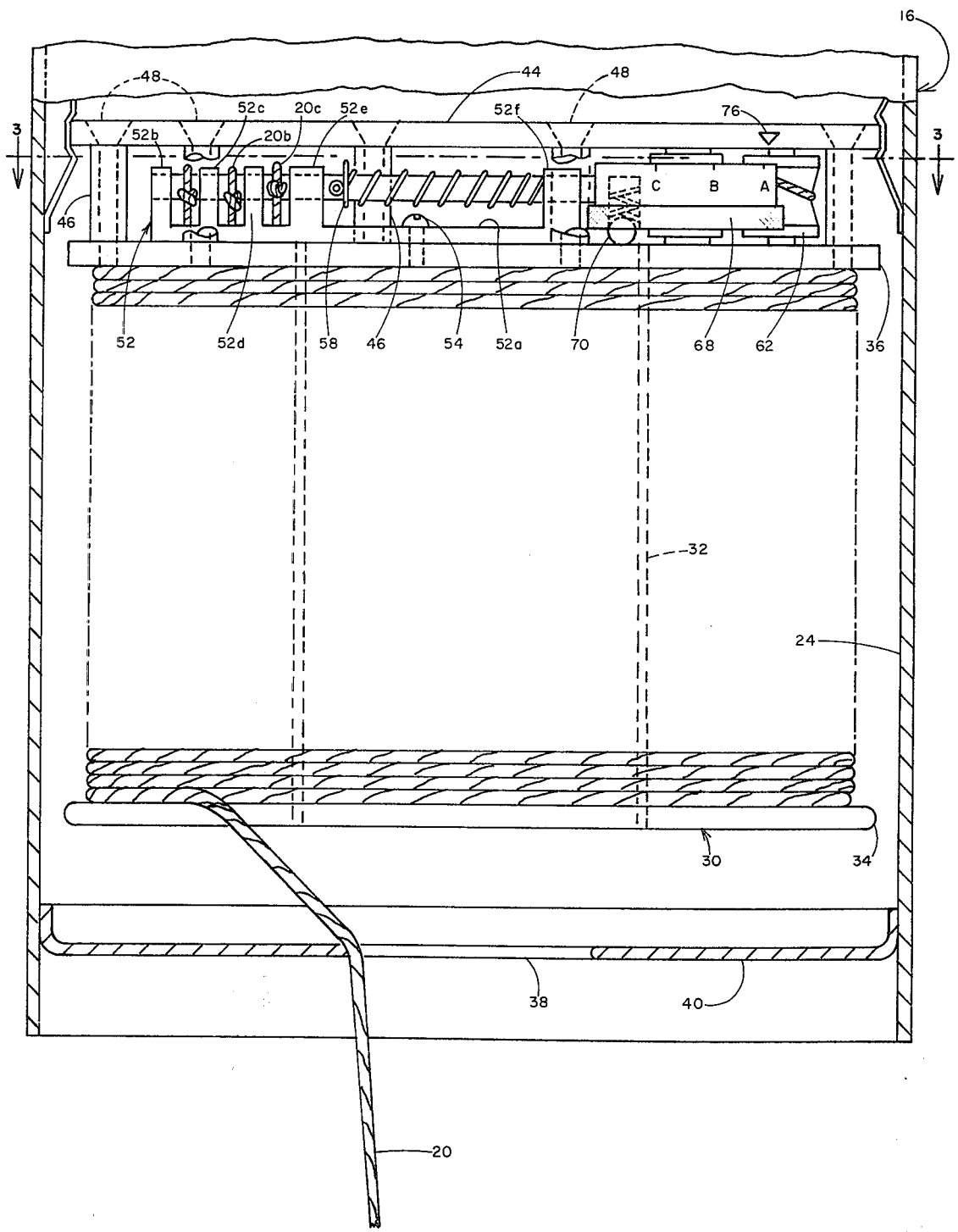
FIG. 2 is an enlarged view, partly in section, of the spool device portion of FIGS. 1a–1c.
Figure 3:
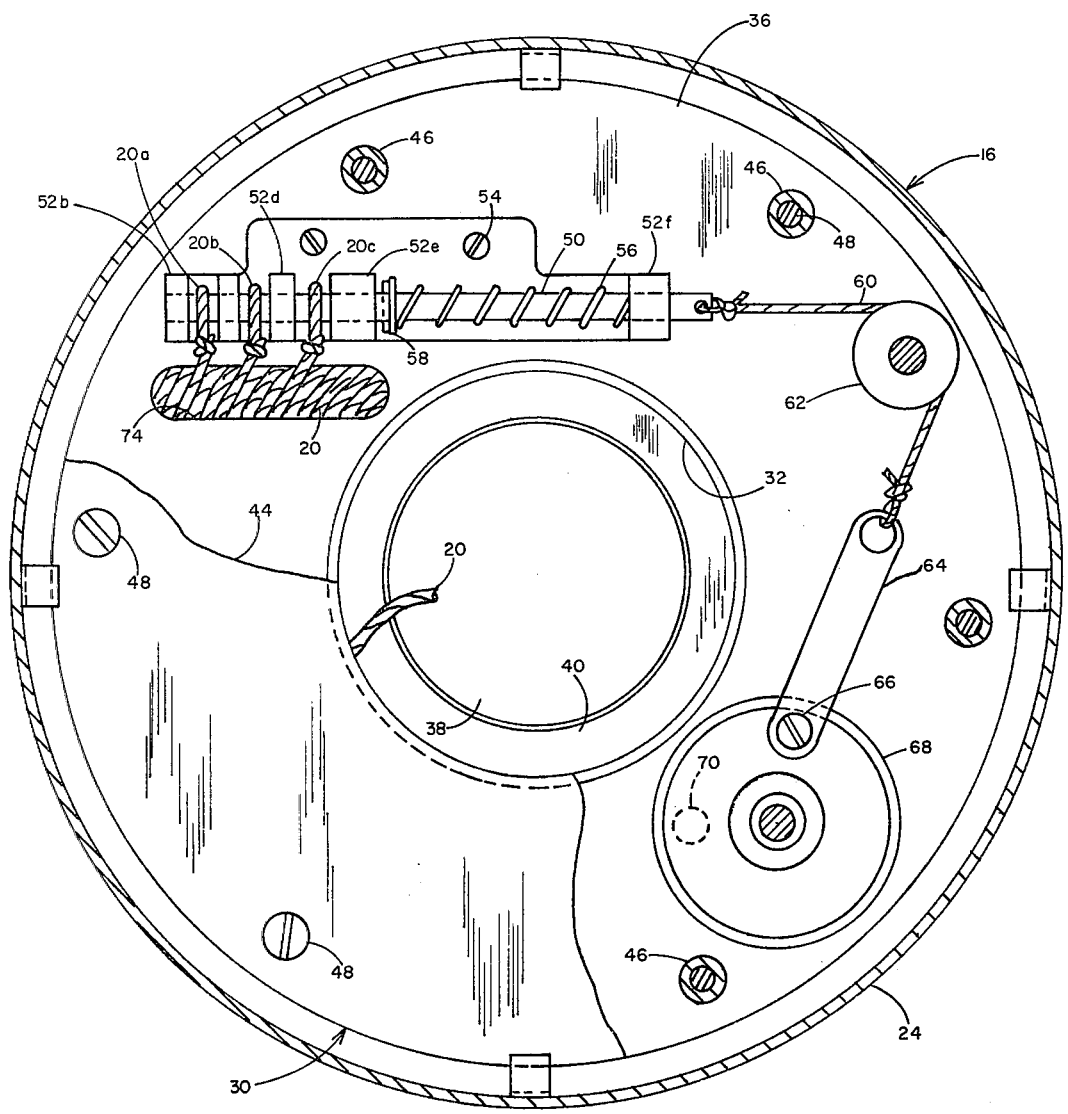
FIG. 3 is a sectional view taken substantially along line 3—3 of FIG. 2.

Referring now to FIGS. 2 and 3, the spool section 16 comprises a cylindrical wall 24 housing a depth selecting spool, indicated generally at 30, which is an exemplary embodiment of the invention. The spool 30 comprises a drum portion in the form of a central tube 32 made of metal or other rigid material, and annular spool end plates 34 and 36 fixed to the opposite ends of the tube, as by welding, to form line confining flanges. Line 20 is wound on the spool 30 and has its outer end portion leading to the payload 18 through a central aperture 38 in a disc 40 retained within wall 24.

Mounted in spaced, substantially congruent, relation to annular spool end plate 36 is an annular plate 44, the spacing being determined by tubular spacers 46 through which mounting screws 48 extend into plate 36. Between plates 36 and 44 is mounted the line length selecting means comprising a pin 50 that is reciprocable in a guide member 52. Guide member 52 includes a base 52a, that is fixed by screws 54 to plate 36, and a plurality of spaced portions 52b, 52c, 52d, 52e, and 52f, having aligned bores in which pin 50 is reciprocable. Portions of pin 50 are exposed between spaced guide portions 52b, 52c, 52d, 52e, and 52f. A spring 56 acts between guide portion 52f and a stop washer 58 to resiliently urge pin 50 to its illustrated position.

A lanyard 60 is connected from one end of pin 50, around a fair-lead sheave 62, to a link 64 that is eccentrically connected at 66 to a thumb-wheel 68 rotatably mounted between plates 36 and 44. A spring biased detent ball 70 serves to hold wheel 68 in any of a plurality of selectable rotational positions. Suitable line length selecting indicia are conveniently displayed on the side of thumb-wheel 68 to aid in selecting a depth in accordance with the position of that wheel in a manner which will become apparent as the description proceeds.

Line 20 is provided with knotted loops 20a, 20b, and 20c at predetermined positions along the length of line 20, which loops extend upwardly through an elongated port 74 in plate 36 and are engaged by those portions of pin 50 that are exposed between the guide portions 52b, 52c, 52d, and 52e.

MODE OF OPERATION

Prior to use, the spool 30 is programmed to pay out a selected line length by rotating (if necessary) thumb-wheel 68 to bring the desired depth indicia adjacent a suitable reference mark 76. This causes link 64 and lanyard 60 to retract pin 50 from the appropriate loop or loops 20a, 20b, and 20c. Line 20 will, when the package 10 has been dropped and payload 18 separated, pay out until a pin retained loop is reached or, if all loops have been released, to the inner end of line 20 which is attached to the spool 30.

It will be appreciated that the invention has provided a spooling device that can be very quickly set to select one of a plurality of predetermined line lengths, and meets the aforementioned objects and advantages in a particularly efficacious manner. Various departures from the example may, of course, be utilized. For example, the spool may be associated with the payload rather than with the float. The payload, may be a floating device, and the spool associated with it or with an anchor. Thus, it will be recognized that either the float or the anchor may be regarded as a positioning reference for the payload. Moreover, operation of the pin actuating wheel may be accomplished by motor means, rather than manually, For example, if rotated by a clockwork mechanism, a time delay feature is achieved. Alternatively, the drive motor may be remotely controlled to provide for line pay-out selection from a distance.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A spooling device for paying out a predetermined length of line selected from a plurality of available lengths, said device comprising:
   spool means for holding in coiled condition a line of a predetermined overall length, said spool comprising a drum portion and first and second flanges fixed at opposite ends of said drum portion, one of said flanges having an opening therethrough;
   a line of said predetermined overall length wound on said spool means; said line having a plurality of loops formed therein, each at a predetermined location along the overall length thereof, said loops extending through said opening in said one flange; and
   line length selector means, mounted on said one of said flanges of said spool means on the side thereof remote from said drum portion and cooperable with said loops so as to selectively predetermine the length of line that can be spooled off of said spool means, said line length selector means comprising a guide member mounted on said one flange and including a plurality of spaced guide portions having aligned bores, and a pin reciprocably disposed in said aligned bores with portions of said pin exposed between said spaced guide portions and extending through one loop between each two spaced guides.

2. A spooling device as defined in claim 1, and wherein said selector means further comprises:
   spring means resiliently urging said pin axially in said bores in a first direction; and
   pin actuating means, cooperable with said pin, for controllably effecting movement of said pin, whereby said pin can be withdrawn from said loops.

3. A spooling device as defined in claim 2, and wherein said pin actuating means comprises:
   a wheel element rotatably mounted on said one flange, and coupling means having one end eccentrically connected to said wheel element and the other end connected to said pin, for effecting linear motion of said pin in response to rotary motion of said wheel element.

4. A spooling device as defined in claim 3, and wherein said coupling means comprises a fairlead sheave mounted on said one flange and a flexible element passing around said sheave.

5. A spooling device as defined in claim 4, and wherein said wheel element comprises a thumb-wheel carrying indicia representative of line length selections, and detent means for yieldably retaining said thumb-wheel in any one of a plurality of positions, each corresponding to a line length selection.

6. In an underwater instrumentation package including a positioning reference portion and a payload portion separable from the reference portion, a spooling device for paying out a predetermined length of line interconnecting said portions and selected from a plurality of available lengths, said spooling device comprising:
   a spool having a tubular drum portion and first and second circular plates fixed at opposite ends of said drum portion and presenting line confining first and second flanges, respectively, said first flange having an opening therethrough;
   a line of predetermined overall length wound on said spool between the flanges thereof, said line being characterized by a plurality of knotted loops formed therein at different locations along said overall length of said line and corresponding with said plurality of available lengths, said loops projecting outwardly through said opening in said first flange;
   a third circular plate mounted in substantially congruent, spaced, parallel relation to said first plate;
   a guide member mounted between said first and third plates and including a plurality of spaced guide portions having aligned bores;
   a pin slidably received in said bores and having a plurality of portions exposed between said spaced guide portions;
   said loops extending through said opening with one loop engaged by an exposed portion of said pin between each two spaced guides;

a spring acting between said guide member and said pin so as to urge said pin in a loop engaging direction;

a thumb-wheel rotatably mounted between said first and third plates and having line length indicia thereon corresponding to said available lengths; and pull means, connected to one end of said pin and eccentrically connected to said thumb-wheel, for retracting said pin from engagement with said loops upon rotation of said thumb-wheel so as to select one of said available lengths.

7. A spooling device as defined in claim 6, and further comprising detent means, cooperable between said thumb-wheel and one of said first and third plates, for yieldably retaining said thumb-wheel in a selected rotative position against the action of said spring.

* * * * *